US011708075B2

(12) United States Patent
Lewandowski et al.

(10) Patent No.: US 11,708,075 B2
(45) Date of Patent: Jul. 25, 2023

(54) ENHANCED ADAPTIVE CRUISE CONTROL

(71) Applicant: Ford Global Technologies, LLC, Dearborn, MI (US)

(72) Inventors: Andrew Denis Lewandowski, Sterling Heights, MI (US); Jordan Barrett, Milford, MI (US); Grant Patrick Mayer, Plymouth, MI (US); Tim Beck, Petersburg, MI (US); Keith Weston, Canton, MI (US); Brendan F. Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 17/225,443

(22) Filed: Apr. 8, 2021

(65) Prior Publication Data
US 2022/0324448 A1 Oct. 13, 2022

(51) Int. Cl.
*B60W 30/16* (2020.01)
*B60W 50/00* (2006.01)
*G05D 1/02* (2020.01)

(52) U.S. Cl.
CPC ........ *B60W 30/16* (2013.01); *B60W 50/0097* (2013.01); *G05D 1/0223* (2013.01); *B60W 2554/4042* (2020.02); *B60W 2554/4043* (2020.02); *B60W 2554/4045* (2020.02); *G05D 2201/0213* (2013.01)

(58) Field of Classification Search
None
See application file for complete search history.

(56) References Cited

U.S. PATENT DOCUMENTS

| | | | | |
|---|---|---|---|---|
| 2017/0072954 A1* | 3/2017 | Nemoto | ................ | B60W 30/16 |
| 2017/0153639 A1* | 6/2017 | Stein | ...................... | G08G 1/167 |
| 2017/0341647 A1* | 11/2017 | Rajvanshi | ............. | B60W 30/10 |
| 2018/0111617 A1 | 4/2018 | Stahl | | |

(Continued)

FOREIGN PATENT DOCUMENTS

| | | | | |
|---|---|---|---|---|
| CN | 110097785 A | | 8/2019 | |
| CN | 111462503 B | * | 6/2021 | ............. G06T 7/292 |

OTHER PUBLICATIONS

"Estimating Acceleration and Lane-Changing Dynamics from Next Generation Simulation Trajectory Data", Thiemann et al., Transportation Research Record: Journal of the Transportation Research Board, No. 2088, Transportation Research Board of the National Academies, Washington, D.C., 2008, pp. 90-101. (Year: 2008).*

(Continued)

*Primary Examiner* — Anne Marie Antonucci
*Assistant Examiner* — Amelia Vorce
(74) *Attorney, Agent, or Firm* — Frank A. MacKenzie; Bejin Bieneman PLC

(57) ABSTRACT

While operating a host vehicle in a lane, a target vehicle is detected entering the lane in front of the vehicle. A trajectory of the target vehicle is predicted based on sensor data. Upon determining that the target vehicle will pass through the lane based on the predicted trajectory, the host vehicle is operated based on determining a presence or an absence of a lead vehicle. Upon determining that the target vehicle will remain in the lane based on the predicted trajectory, the host vehicle is operated with the target vehicle as the lead vehicle.

20 Claims, 8 Drawing Sheets

(56) References Cited

U.S. PATENT DOCUMENTS

| | | | |
|---|---|---|---|
| 2018/0120859 A1* | 5/2018 | Eagelberg | G01C 21/34 |
| 2019/0143968 A1* | 5/2019 | Song | B60W 40/02 |
| | | | 701/301 |
| 2019/0184987 A1* | 6/2019 | Lee | G01S 13/931 |
| 2019/0217861 A1* | 7/2019 | Kurahashi | B60W 30/18163 |
| 2019/0266421 A1* | 8/2019 | Kim | H04N 7/188 |
| 2019/0270453 A1 | 9/2019 | Katsura et al. | |
| 2019/0367025 A1* | 12/2019 | Pathak | B60W 40/04 |
| 2020/0086869 A1 | 3/2020 | Oguro et al. | |
| 2020/0238997 A1* | 7/2020 | Schleicher | B60W 40/04 |
| 2021/0009127 A1* | 1/2021 | Horiba | B60W 50/0097 |
| 2021/0110483 A1* | 4/2021 | Shalev-Shwartz | G08G 1/163 |
| 2021/0110484 A1* | 4/2021 | Shalev-Shwartz | B60W 10/18 |
| 2021/0179092 A1* | 6/2021 | Chen | B60W 10/04 |
| 2021/0300412 A1* | 9/2021 | Dingli | B60W 50/0098 |
| 2022/0203982 A1* | 6/2022 | Choi | B60W 50/14 |
| 2022/0203984 A1* | 6/2022 | Vijaya Kumar | B60W 30/162 |

OTHER PUBLICATIONS

"IMM-Based Lane-Change Prediction in Highways With Low-Cost GPS/INS", Toledo-Moreo et al., IEEE Transactions on Intelligent Transportation Systems, vol. 10, No. 1, Mar. 2009. (Year: 2009).*
"Modeling Drivers' Acceleration and Lane Changing Behavior", Ahmed, Massachusetts Institute of Technology, Cambridge, MA (1996). (Year: 1996).*
"Modeling Duration of Lane Changes", Toledo et al., Transportation Research Record: Journal of the Transportation Research Board, No. 1999, Transportation Research Board of the National Academies, Washington, D.C., 2007, pp. 71-78. (Year: 1999).*

\* cited by examiner

ENHANCED ADAPTIVE CRUISE CONTROL

BACKGROUND

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the data. Vehicle sensors can provide data concerning routes to be traveled and objects to be avoided in the vehicle's environment. For example, in a cruise control or adaptive cruise control feature, a vehicle speed can be set and maintained according to user input and/or based on a speed and/or relative position of a reference vehicle, typically an immediately preceding vehicle.

DETAILED DESCRIPTION

Figure 1:
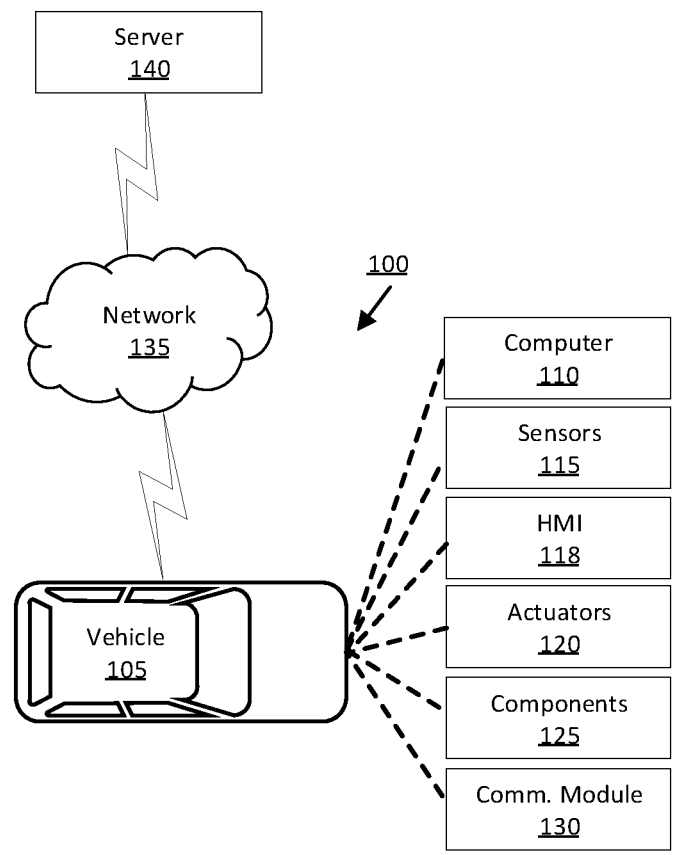
FIG. 1 is a block diagram illustrating an example vehicle control system for a vehicle.

A host vehicle can include an adaptive cruise control system to control a speed of the host vehicle, including by taking into account a target vehicle likely to pass through a lane in which the host vehicle is operating. In an adaptive cruise control system, a vehicle computer can maintain or adjust the speed of the host vehicle in a lane based on a speed and position of a lead vehicle relative to the host vehicle. For example, the vehicle computer can actuate a braking component to reduce the speed of the host vehicle when the lead vehicle decelerates and/or is within a specified distance of the host vehicle. As another example, the vehicle computer can actuate a propulsion component to increase the speed of the host vehicle when the lead vehicle accelerates and/or is outside of the specified distance of the host vehicle. Typically, when a target vehicle enters the lane in front of the host vehicle, the vehicle computer may identify the target vehicle as a lead vehicle and adjust the speed of the host vehicle based on a speed and position of the target vehicle relative to the host vehicle. However, when the target vehicle does not remain in, i.e., passes through, the lane, the vehicle computer may re-adjust the speed of the host vehicle based on, e.g., a speed and position of a lead vehicle relative to the host vehicle, or a pre-set speed when a lead vehicle is not present. Adjusting the speed of the host vehicle based on a target vehicle that does not remain in the lane can result in aggressive deceleration, e.g., to avoid impacting the target vehicle, and/or aggressive acceleration, e.g., to increase the host vehicle speed to a pre-set speed, which can reduce a fuel consumption efficiency of the host vehicle.

Advantageously, and as described herein, the vehicle computer can predict a trajectory of a target vehicle entering the lane based on sensor data. The vehicle computer can determine whether the target vehicle will remain in the lane or pass through the lane based on the predicted trajectory. Upon determining that the target vehicle will remain in the lane, the vehicle computer can operate the host vehicle with the target vehicle as the lead vehicle. Additionally, upon determining that the target vehicle will pass through the lane, the vehicle computer can operate the host vehicle based on a presence or an absence of a lead vehicle. That is, the vehicle computer can determine whether the target vehicle is a lead vehicle based on the predicted trajectory. By determining that the target vehicle is not a lead vehicle, the vehicle computer can prevent operating the host vehicle based on the target vehicle, which can reduce a likelihood of the host vehicle aggressively accelerating and decelerating, e.g., to adjust and re-adjust the speed of the host vehicle when the target vehicle passes through the lane. By reducing aggressive acceleration and deceleration, the vehicle computer can operate the host vehicle in a manner that can improve operating efficiency of the host vehicle, e.g., by providing for more smooth control of speed and steering and/or improving fuel efficiency.

A system includes a computer including a processor and a memory, the memory storing instructions executable by the processor to, while operating a host vehicle in a lane, detect a target vehicle entering the lane in front of the host vehicle. The instructions further include instructions to predict a trajectory of the target vehicle based on sensor data. The instructions further include instructions to, upon determining that the target vehicle will pass through the lane based on the predicted trajectory, operate the host vehicle based on determining a presence or an absence of a lead vehicle. The instructions further include instructions to, upon determining that the target vehicle will remain in the lane based on the predicted trajectory, operate the host vehicle with the target vehicle as the lead vehicle.

The instructions can further include instructions to operate the host vehicle based on a speed of the lead vehicle.

The instructions can further include instructions to update a speed of the host vehicle to maintain at least a following distance between the host vehicle and the lead vehicle.

The instructions can further include instructions to predict that the trajectory will extend through the lane based on detecting a lateral speed of the target vehicle that is greater than a threshold.

The instructions can further include instructions to predict that the trajectory will remain in the lane based on detecting a lateral speed of the target vehicle that is less than or equal to a threshold.

The instructions can further include instructions to predict that the trajectory will extend through the lane based on detecting an angle of the target vehicle relative to the lane being greater than a threshold.

The instructions can further include instructions to predict that the trajectory will remain in the lane based on detecting an angle of the target vehicle relative to the lane that is less than or equal to a threshold.

The instructions can further include instructions to identify the target vehicle as the lead vehicle additionally based on determining a speed of the target vehicle is less than a speed of the host vehicle.

The instructions can further include instructions to, upon detecting the target vehicle in the lane upon expiration of a timer, identify the target vehicle as the lead vehicle. The instructions can further include instructions to initiate the timer upon detecting the target vehicle in the lane.

The instructions can further include instructions to detecting the target vehicle departing the lane prior to expiration of a timer, operate the host vehicle based on determined the presence or the absence of the lead vehicle. The instructions can further include instructions to initiate the timer upon detecting the target vehicle in the lane.

The instructions can further include instructions to identify the target vehicle as the lead vehicle additionally based on a distance between the target vehicle and the host vehicle being less than a threshold distance.

The instructions can further include instructions to, upon determining the presence of the lead vehicle, identify the target vehicle as the lead vehicle additionally based on detecting the target vehicle entering the lane between the host vehicle and the lead vehicle.

The instructions can further include instructions to, upon detecting the target vehicle entering the lane, update a lateral position of the host vehicle within the lane.

A method includes, while operating a host vehicle in a lane, detecting a target vehicle entering the lane in front of the host vehicle. The method further includes predicting a trajectory of the target vehicle based on sensor data. The method further includes, upon determining that the target vehicle will pass through the lane based on the predicted trajectory, operating the host vehicle based on determining a presence or an absence of a lead vehicle. The method further includes, upon determining that the target vehicle will remain in the lane based on the predicted trajectory, operating the host vehicle with the target vehicle as the lead vehicle.

The method can further include predicting that the trajectory will extend through the lane based on detecting a lateral speed of the target vehicle that is greater than a threshold.

The method can further include predicting that the trajectory will remain in the lane based on detecting a lateral speed of the target vehicle that is less than or equal to a threshold.

The method can further include predicting that the trajectory will extend through the lane based on detecting an angle of the target vehicle relative to the lane being greater than a threshold.

The method can further include predicting that the trajectory will remain in the lane based on detecting an angle of the target vehicle relative to the lane that is less than or equal to a threshold.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-4C, an example vehicle control system 100 includes a vehicle 105. A vehicle computer 110 in the host vehicle 105 receives data from sensors 115. The vehicle computer 110 is programmed to, while operating the host vehicle 105 in a host lane 205, detect a target vehicle 215 entering the host lane 205 in front of the host vehicle 105. The vehicle computer 110 is further programmed to predict a trajectory of the target vehicle 215 based on sensor 115 data. The vehicle computer 110 is further programmed to, upon determining that the target vehicle 215 will pass through the host lane 205 based on the predicted trajectory, operate the host vehicle 105 based on a presence or an absence of a lead vehicle 220. The vehicle computer 110 is further programmed to, upon determining that the target vehicle 215 will remain in the host lane 205 based on the predicted trajectory, operate the host vehicle 105 with the target vehicle 215 as the lead vehicle 220.

Turning now to FIG. 1, the host vehicle 105 includes the vehicle computer 110, sensors 115, actuators 120 to actuate various vehicle components 125, and a vehicle communications module 130. The communications module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out host vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the host vehicle 105 in an autonomous mode, a semi-autonomous mode, or a non-autonomous (or manual) mode, i.e., can control and/or monitor operation of the host vehicle 105, including controlling and/or monitoring components 125. For purposes of this disclosure, an autonomous mode is defined as one in which each of host vehicle 105 propulsion, braking, and steering are controlled by the vehicle computer 110; in a semi-autonomous mode the vehicle computer 110 controls one or two of host vehicle 105 propulsion, braking, and steering; in a non-autonomous mode a human operator controls each of vehicle 105 propulsion, braking, and steering.

The vehicle computer 110 may include programming to operate one or more of host vehicle 105 brakes, propulsion (e.g., control of acceleration in the host vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the host vehicle 105 for monitoring and/or controlling various vehicle components 125, e.g., a transmission controller, a brake controller, a steering controller, etc. The vehicle computer 110 is generally arranged for communications on a vehicle communication network that can include a bus in the host vehicle 105 such as a controller area network (CAN) or the like, and/or other wired and/or wireless mechanisms.

Via the host vehicle 105 network, the vehicle computer 110 may transmit messages to various devices in the host vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the host vehicle 105, behind a host vehicle 105 front windshield, around the host vehicle 105, etc., that provide relative locations, sizes, and shapes of objects surrounding the host vehicle 105. As another example, one or more radar sensors 115 fixed to host vehicle 105 bumpers may provide data to provide locations of the objects, second vehicles, etc., relative to the location of the host vehicle 105. The sensors 115 may further alternatively or additionally, for example, include camera sensor(s) 115, e.g. front view, side view, etc., providing images from an area surrounding the host vehicle 105. In the context of this disclosure, an object is a physical, i.e., material, item that has mass and that can be represented by physical phenomena (e.g., light or other electromagnetic waves, or sound, etc.) detectable by sensors 115. Thus, the host vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the host vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the host vehicle 105. As one example, the data may be image data of the environment around the host vehicle 105. In such an example, the image data may include one or more objects and/or markings, e.g., lane markings 305, on or along a road. Image data herein means digital image data, e.g., comprising pixels with intensity and color values, that can be acquired by camera sensors 115. The sensors 115 can be mounted to any suitable location in or on the host vehicle 105, e.g., on a host vehicle 105 bumper, on a host vehicle 105 roof, etc., to collect images of the environment around the host vehicle 105.

The host vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a host vehicle 105.

In the context of the present disclosure, a vehicle component 125 is one or more hardware components adapted to perform a mechanical or electro-mechanical function or operation—such as moving the host vehicle 105, slowing or stopping the host vehicle 105, steering the host vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The host vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communications network and can send and/or receive messages to/from the vehicle computer 110 and other vehicle sub-systems.

In addition, the vehicle computer 110 may be configured for communicating via a vehicle-to-vehicle communication module 130 or interface with devices outside of the host vehicle 105, e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicleto-infrastructure (V2I), and that may be provided by communication module 130 according to any suitable short-range communications mechanism, e.g., DSRC, cellular, or the like.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2:
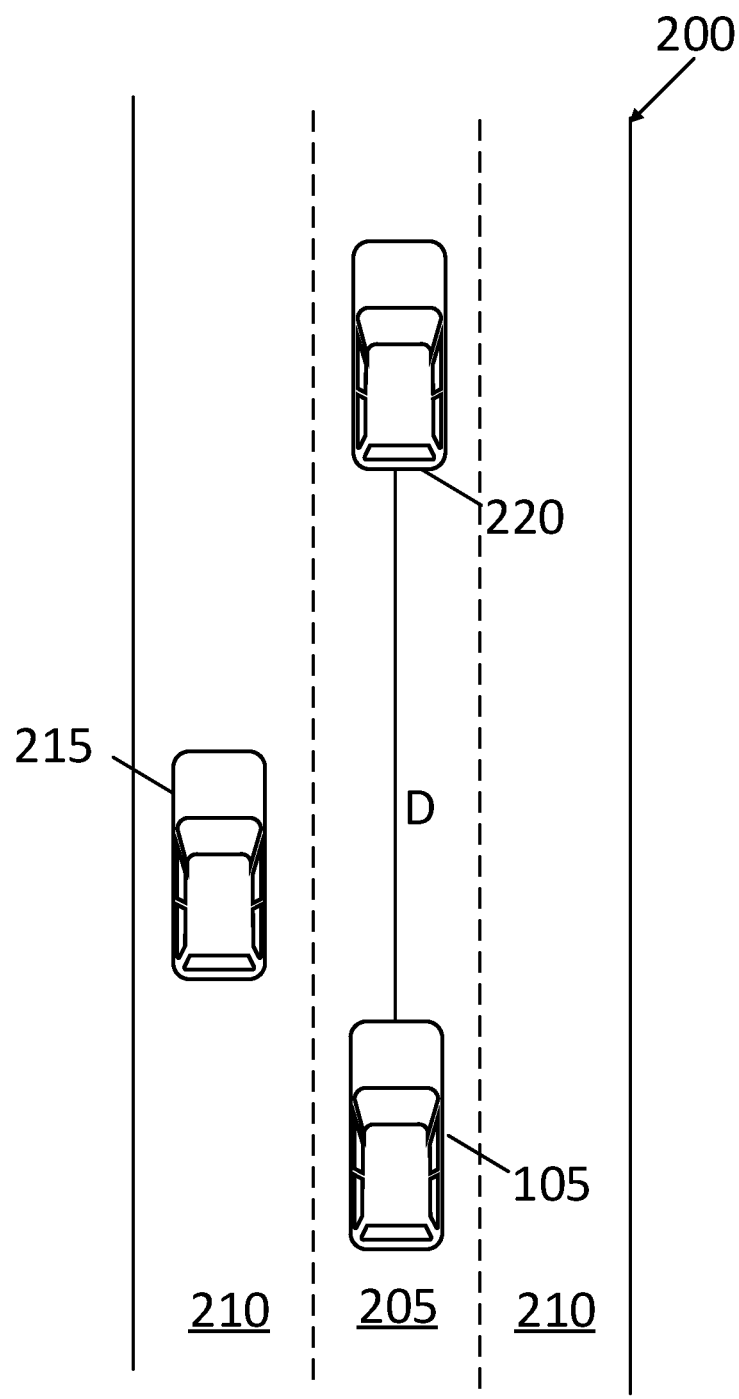
FIG. 2 is a diagram illustrating a host vehicle operating in an exemplary lane of an exemplary road.
Figure 3A:
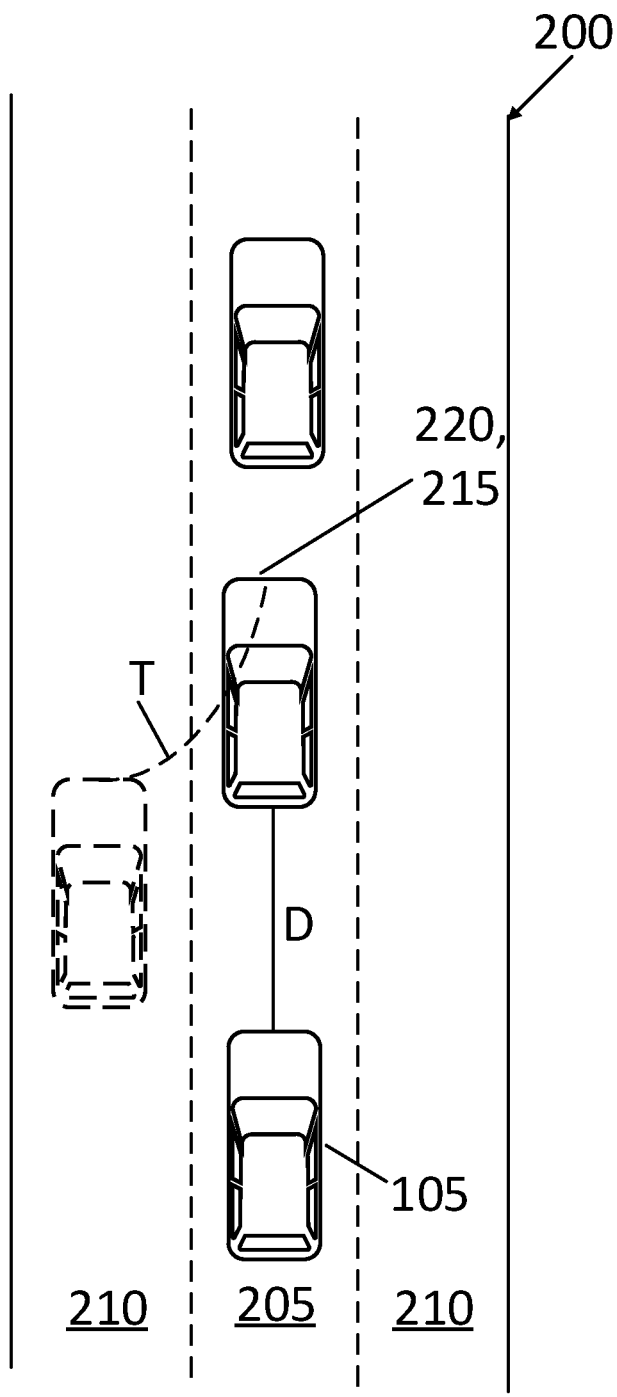
FIGS. 3A-3B are diagrams illustrating predicting a trajectory of a target vehicle according to the system of FIG. 1.
Figure 3B:
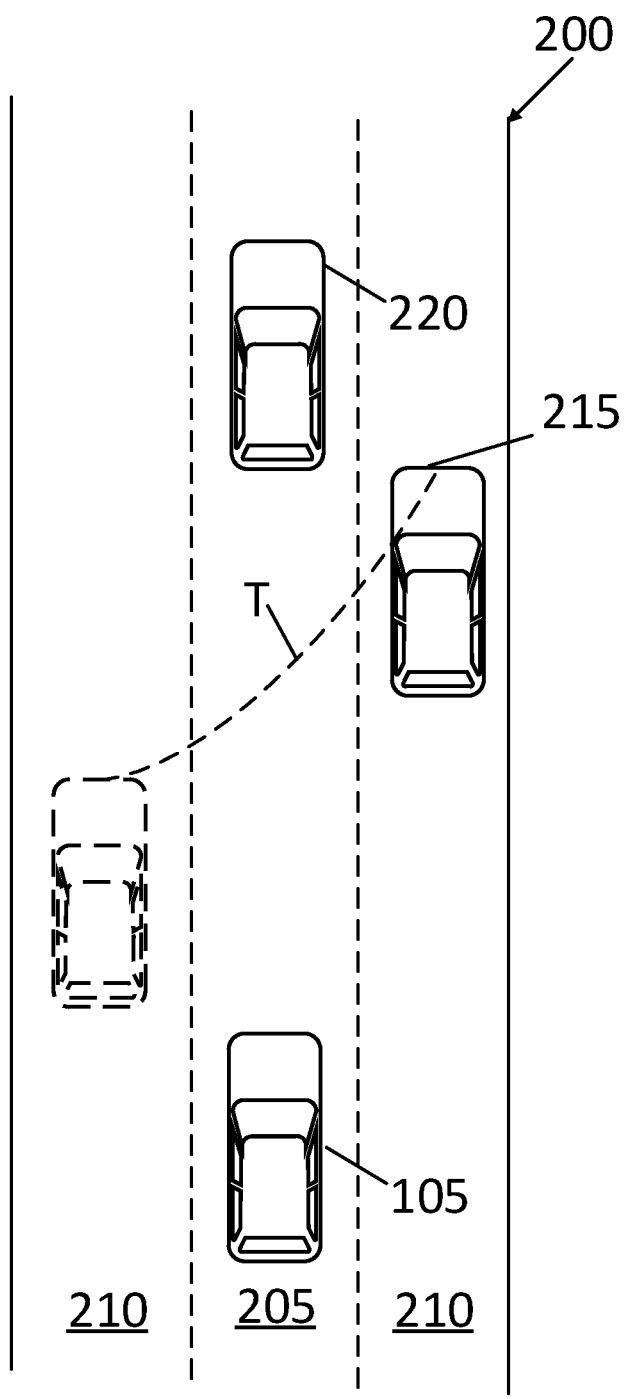

FIG. 2 is a diagram illustrating a host vehicle 105 operating in a host lane 205 of an example road 200. A lane is a specified area of the road for vehicle travel. A road in the present context is an area of ground surface that includes any surface provided for land vehicle travel. A lane of a road is an area defined along a length of a road, typically having a width to accommodate only one vehicle, i.e., such that multiple vehicles can travel in a lane one in front of the other, but not abreast of, i.e., laterally adjacent, one another.

The vehicle computer 110 may be programmed to transition a cruise control mode between a disabled state and an enabled state based on receiving a user input selecting the cruise control mode, e.g., via the HMI 118. The cruise control mode may be selectable based on a longitudinal speed of the host vehicle 105, i.e., a speed in a direction along the length of a lane. For example, the vehicle computer 110 can determine the longitudinal speed of the host vehicle 105 based on sensor 115 data, such as wheel speed sensor 115 data. The vehicle computer 110 can then compare the longitudinal speed of the host vehicle 105 to a speed threshold. The speed threshold specifies a minimum longitudinal speed at which the cruise control mode can be enabled. The speed threshold may be determined empirically, e.g., based on testing that allows for determining a minimum longitudinal speed at which the vehicle computer 110 can control the host vehicle 105. The speed threshold may be stored, e.g., in a memory of the vehicle computer 110.

The vehicle computer 110 can compare the longitudinal speed of the host vehicle 105 to the speed threshold. If the longitudinal speed of the host vehicle 105 is greater than or equal to the speed threshold, then the vehicle computer 110 may enable user selection of the cruise control mode. For example, the vehicle computer 110 may actuate the HMI 118 to detect a first user input selecting the cruise control mode. For example, the HMI 118 may be programmed to display a virtual button on a touchscreen display that the user can select to select the cruise control mode. In this situation, the HMI 118 may activate sensors 115 that can detect the user selecting the virtual button to select the cruise control mode. As another example, the HMI 118 may be programmed to provide a virtual button or the like that is non-selectable when the cruise control mode is in the disabled state, and selectable via the touchscreen display when the cruise control mode is in the enabled state. Upon detecting the first user input, the HMI 118 can then provide the first user input to the vehicle computer 110, and the vehicle computer 110 can select the cruise control mode based on the first user input.

If the longitudinal speed of the host vehicle 105 is less than the speed threshold, then the vehicle computer 110 may prevent user selection of the cruise control mode. For example, the vehicle computer 110 may actuate the HMI 118 to disable detection of the first user input. In this manner, the vehicle computer 110 can prevent the user from selecting the cruise control mode. For example, the HMI 118 may be programmed to remove a virtual button from the touchscreen display. As another example, the HMI 118 may be programmed to make the virtual button non-selectable.

Upon transitioning the cruise control mode to the enabled state, the vehicle computer 110 may actuate the HMI 118 to detect a second user input, e.g., in substantially the same manner as discussed above regarding the first user input. The second user input specifies a pre-set longitudinal speed for operation of the host vehicle 105. The vehicle computer 110 can operate the host vehicle 105 at or below the pre-set longitudinal speed specified by the second user input when the cruise control mode is enabled. Additionally, the vehicle computer 110 can determine a following distance between the host vehicle 105 and a lead vehicle 220 (as discussed below). The following distance specifies a minimum distance between the host vehicle 105 and a lead vehicle 220 at which the vehicle computer 110 can operate the host vehicle 105. The following distance may be determined empirically, e.g., based on a distance at which the vehicle computer 110 can control the host vehicle 105 to prevent the host vehicle 105 from impacting the lead vehicle 220 (e.g., based on a longitudinal speed of the host vehicle 105, a longitudinal speed of the lead vehicle 220, etc.).

The vehicle computer 110 can then operate the host vehicle 105 to satisfy the pre-set longitudinal speed and following distance when the cruise control mode is enabled. That is, the vehicle computer 110 may be programmed to adjust the longitudinal speed and/or acceleration of the host vehicle 105 based on an average longitudinal speed and/or acceleration of the lead vehicle 220 while operating the host vehicle 105 in the host lane 205, e.g., to maintain at least the following distance from the lead vehicle 220 and/or to maintain the longitudinal speed of the host vehicle 105 less than or equal to the pre-set longitudinal speed.

In the cruise control mode, the vehicle computer 110 may be programmed to identify a host lane 205, i.e., a lane in which the host vehicle 105 is operating, and one or more target lanes 210, i.e., a lane in which the host vehicle 105 is not operating, on the road 200. For example, the vehicle computer 110 can receive map data and/or location data, e.g., GPS data, from a remote server computer 140 specifying the host lane 205 and the target lane(s) 210. As another example, the vehicle computer 110 may identify the host lane 205 and the target lane(s) 210 based on sensor 115 data. That is, the vehicle computer 110 can be programmed to receive sensor 115 data, typically, image data, from sensors 115 and to implement various image processing techniques to identify the host lane 205 and the target lane(s) 210. For example, lanes can be indicated by markings, e.g., painted lines on the road 200, and image recognition techniques, such as are known, can be executed by the vehicle computer 110 to identify the host lane 205. For example, the vehicle computer 110 can identify solid lane markings on opposite sides of the host vehicle 105. The vehicle computer 110 can then identify the host lane 205 of host vehicle 105 operation based on a number of groups of dashed lane markings between each side of the host vehicle 105 and the respective solid lane marking. A solid lane marking is a marking extending continuously, i.e., is unbroken, along a length of a road and defining at least one boundary of a lane. A group of dashed lane markings includes a plurality of markings spaced from each other along a length of a road and defining at least one boundary of a lane. Additionally, the vehicle computer 110 can determine the target lane(s) 210 on each side of the host lane 205 based on the number of groups of dashed lane markings on each side of the host vehicle 105 (e.g., a number of target lanes is equal to the number of groups of dashed lane markings).

While operating in the host lane 205, the vehicle computer 110 can receive sensor 115 data, e.g., image data, of the environment around the host vehicle 105 in the host lane 205. The image data can include one or more vehicles traveling on the road 200 around the host vehicle 105. For example, object classification or identification techniques, can be used, e.g., in the vehicle computer 110 based on lidar sensor 115, camera sensor 115, etc., data to identify a type of object, e.g., a vehicle, a bicycle, an aerial drone, etc., as well as physical features of objects.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification and/or a classification (i.e., movable or non-movable) of one or more objects or an indication that no object is present in the respective region of interest. Further, a coordinate system (e.g., polar or cartesian) applied to an area proximate to the host vehicle 105 can be used to specify locations and/or areas (e.g., according to the host vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

Upon identifying the type of object as a vehicle, the vehicle computer 110 is programmed to identify the vehicle as a target vehicle 215 or a lead vehicle 220 based on a longitudinal position of the vehicle and a lane of vehicle operation. A lead vehicle 220 is a vehicle operating in the host lane 205 and forward of the host vehicle 105. A target vehicle 215 is a vehicle operating in a target lane 210. The target vehicle may operate forward of, rearward of, or next to the host vehicle 105. For example, a classifier can be further trained with data known to represent various longitudinal positions and lanes of operation. Thus, in addition to identifying the object as a vehicle, the classifier can output an identification of a target vehicle 215 or a lead vehicle 220 based on the longitudinal position and the lane of vehicle operation. Once trained, the classifier can accept as input host vehicle sensor 115 data, e.g., an image, and then provide as output for each of one or more respective regions of interest in the image, an identification of a target vehicle 215 based on the vehicle operating in a target lane 210, or that no target vehicle 215 is present in the respective region of interest based on detecting no vehicle operating in a target lane 210. Additionally, once trained, the classifier can accept as input host vehicle sensor 115 data, e.g., an image, and then provide as output for each of one or more respective regions of interest in the image, an identification of a lead vehicle 220 based on the vehicle being forward of the host vehicle 105 and operating in a host lane 205, or that no lead vehicle 220 is present in the respective region of interest based on detecting no vehicle forward of the host vehicle 105 and operating in the host lane 205.

The vehicle computer 110 may determine the longitudinal position of a detected vehicle based on sensor 115 data. For example, the vehicle computer 110 may determine a detected vehicle is forward of the host vehicle 105 based on image data from a forward-facing camera. Forward of the host vehicle 105 means that a rearmost point of the detected vehicle is forward of a frontmost point of the host vehicle 105. As another example, the vehicle computer 110 may determine the detected vehicle is rearward of the host vehicle 105 based on image data from a rear-facing camera. Rearward of the host vehicle 105 means that a frontmost point of the detected vehicle is rearward of a rearmost point of the host vehicle 105. As yet another example, the vehicle computer 110 may determine the detected vehicle is next to the host vehicle 105 based on image data from a side-facing camera. Next to the host vehicle 105 means any point of the detected vehicle is between the frontmost point and the rearmost point of the host vehicle 10.

The vehicle computer 110 is programmed to determine a lane of operation for the detected vehicle. For example, the vehicle computer 110 may determine the lane of operation of the detected vehicle by using image data to identify lane markings on each side of the detected vehicle, e.g., according to image processing techniques, as discussed above. In such an example, the vehicle computer 110 can determine the detected vehicle is in the host lane 205 when the number of lanes on each side of the detected vehicle is the same as the number of lanes on the respective side of the host vehicle 105, or is in a target lane 210 when the number of lanes on each side of the detected vehicle is different than the number of lanes on the respective side of the host vehicle 105. As another example, the vehicle computer 110 may receive location data from the detected vehicle, e.g., via V2V communications, specifying the lane of operation of the identified vehicle 215, 220.

Additionally, the vehicle computer 110 can be programmed to identify the detected vehicle operating in the host lane 205 in front of the host vehicle 105 as a lead vehicle 220 based on a distance D from the host vehicle 105 to the detected vehicle. For example, the vehicle computer 110 can compare the distance D to a threshold distance. The threshold distance specifies a maximum distance within which the vehicle computer 110 can identify a vehicle as a lead vehicle 220. The threshold distance may be determined empirically, e.g., based on testing that allows for determining a distance within which operation of the host vehicle 105 is updated to avoid impacting the detected vehicle in response to an update to the detected vehicle operation (e.g., based on longitudinal speeds of the host vehicle 105 and the detected vehicle). When the distance D is less than or equal to the threshold distance, the vehicle computer 110 can identify the detected vehicle as a lead vehicle 220. When the distance D is greater than the threshold distance, the vehicle computer 110 can determine that the detected vehicle is not a lead vehicle 220.

The vehicle computer 110 may determine the distance D from the host vehicle 105 to the detected vehicle based on sensor 115 data. For example, a lidar sensor 115, which is similar to a radar sensor 115, uses laser light transmissions (instead of radio transmissions) to obtain reflected light pulses from objects, e.g., the detected vehicle. The reflected light pulses can be measured to determine object distances. Data from the lidar sensor 115 can be provided to generate a three-dimensional representation of detected objects, sometimes referred to as a point cloud.

In the cruise control mode, the vehicle computer 110 can operate the host vehicle 105 based on determining a presence or an absence of a lead vehicle 220 in the host lane 205. The vehicle computer 110 determines a presence of a lead vehicle 220 upon identifying a detected vehicle as a lead vehicle 220 and determines an absence of a lead vehicle 220 upon determining that no detected vehicle is a lead vehicle 220. Upon determining an absence of a lead vehicle 220, the vehicle computer 110 can operate the host vehicle 105 at the pre-set longitudinal speed in the host lane 205. Upon determining a presence of a lead vehicle 220, the vehicle computer 110 can operate the host vehicle 105 to maintain at least the following distance between the host vehicle 105 and the lead vehicle 220. That is, the vehicle computer 110 may adapt the longitudinal speed of the host vehicle 105 based on an average longitudinal speed of the lead vehicle 220. In this situation, the vehicle computer 110 may operate the host vehicle 105 at a longitudinal speed that is less than the pre-set longitudinal speed.

The vehicle computer 110 may be programmed to determine an average longitudinal speed of the lead vehicle 220 based on sensor 115 data. For example, the vehicle computer 110 can determine a longitudinal speed of the lead vehicle 220 at multiple instances. The vehicle computer 110 can then determine an average longitudinal speed of the lead vehicle 220 by summing the determined longitudinal speeds of the lead vehicle 220 and dividing by the number of instances.

The vehicle computer 110 may determine a longitudinal speed of the lead vehicle 220 relative to the host vehicle 105 by determining a change in distance between the lead vehicle 220 and the host vehicle 105 over time. For example, the vehicle computer 110 determine the longitudinal speed of the lead vehicle 220 relative to the host vehicle 105 with the formula $\Delta D/\Delta T$, where $\Delta D$ is a difference between a pair of distances from the host vehicle 105 to the vehicle taken at different times and $\Delta T$ is an amount of time between when the pair of distances was determined. For example, the difference between the pair of distances $\Delta D$ may be determined by subtracting the distance determined earlier in time from the distance determined later in time. In such an example, a positive value indicates that the lead vehicle 220 is traveling slower than the host vehicle 105, and a negative value indicates that the lead vehicle 220 is traveling faster than the host vehicle 105. The vehicle computer 110 can then determine the longitudinal speed of the lead vehicle 220 by combining, i.e., summing, the longitudinal speed of the lead vehicle 220 relative to the host vehicle 105 to the longitudinal speed of the host vehicle 105 (e.g., determined based on sensor 115 data, such as wheel speed sensor data). As another example, the vehicle computer 110 may receive longitudinal speed of the lead vehicle 220, e.g., via V2V communications.

Additionally, in the cruise control mode, the vehicle computer 110 can operate the host vehicle 105 based on detecting a target vehicle 215 alongside the host vehicle 105 via sensor 115 data. Upon detecting the target vehicle 215 alongside the host vehicle 105 for a predetermined time, e.g., 5 seconds, 10 seconds, etc., the vehicle computer 110 can update a longitudinal speed of the host vehicle 105. For example, when the longitudinal speed of the host vehicle 105 is less than the pre-set longitudinal speed, the vehicle computer 110 can increase the longitudinal speed of the host vehicle 105 until the host vehicle 105 is in front of the target vehicle 215. As another example, when the longitudinal speed of the host vehicle 105 is equal to the pre-set longitudinal speed or the distance between the host vehicle 105 and a lead vehicle 220 is equal to the following distance, the vehicle computer 110 can decrease the longitudinal speed of the host vehicle 105 until the target vehicle 215 is in front of the host vehicle 105.

The vehicle computer 110 can detect the target vehicle 215 entering the host lane 205 based on sensor 115 data. For example, when in the cruise control mode, the vehicle computer 110 may detect the target vehicle 215 entering the host lane 205 by using image data to determine that the target vehicle 215 is crossing the lane markings defining a boundary between the host lane 205 and the target lane 210 from which the target vehicle 215 is departing, e.g., according to image processing techniques, as discussed above. As another example, the vehicle computer 110 may receive location data from the target vehicle 215, e.g., via V2V communications, specifying that the target vehicle 215 is entering the host lane 205.

Upon detecting the target vehicle 215 entering the host lane 205, the vehicle computer 110 can update a lateral position of the host vehicle 105 within the host lane 205. For example, prior to detecting the target vehicle 215 entering the host lane 205, the vehicle computer 110 can operate the host vehicle 105 to be centered within the host lane 205, i.e., equidistance from lane markings defining the host lane 205. When the target vehicle 215 enters the host lane 205, the vehicle computer 110 can move the host vehicle 105 away from a lane marking defining a boundary between the host lane 205 and the target lane 210 from which the target vehicle 215 is departing. In this situation, the host vehicle 105 remains in the host lane 205 and the lateral position of the host vehicle 105 is biased away from the target lane 210, i.e., farther from the lane marking defining the boundary between the host lane 205 and the target lane 210 than the other lane marking defining the host lane 205.

Additionally, upon detecting the target vehicle 215 entering the host lane 205, the vehicle computer 110 can determine whether to operate the host vehicle 105 with the target vehicle 215 as a lead vehicle 220. That is, the vehicle computer 110 can determine whether to identify the target vehicle 215 as a lead vehicle 220 such that the vehicle computer 110 can adapt the host vehicle 105 longitudinal speed based on the target vehicle 215. For example, the vehicle computer 110 can identify the target vehicle 215 as a lead vehicle 220 based on a predicted trajectory T of the target vehicle 215. The vehicle computer 110 can predict the trajectory T of the target vehicle 215 will one of remain in the host lane 205 (see FIG. 3A) or pass through the host lane 205 (see FIG. 3B). The vehicle computer 110 can predict the trajectory T of the target vehicle 215 based on sensor 115 data, as discussed below. If the predicted trajectory T remains in the host lane 205, then the vehicle computer 110 can identify the target vehicle 215 as a lead vehicle 220. If the predicted trajectory T passes through the host lane 205, then the vehicle computer 110 determines that the target vehicle 215 is not a lead vehicle 220.

The vehicle computer 110 can, for example, predict the trajectory T based on a lateral speed of the target vehicle 215, i.e., a speed in a direction perpendicular to the length of a lane. The vehicle computer 110 can compare the lateral speed of the target vehicle 215 to a lateral speed threshold. The lateral speed threshold specifies a lateral speed below which the vehicle computer 110 predicts that the trajectory T will remain in the host lane 205. The lateral speed threshold may be determined empirically, e.g., based on testing that allows for determining a lateral speed of a vehicle that indicates that the vehicle will pass through a lane. The lateral speed threshold may be stored, e.g., in a memory of the vehicle computer 110. If the lateral speed of the target vehicle 215 is less than the lateral speed threshold, then the vehicle computer 110 predicts that the trajectory T will remain in the host lane 205. If the lateral speed of the target vehicle 215 is greater than or equal to the lateral speed threshold, then the vehicle computer 110 predicts that the trajectory T will pass through the host lane 205.

Figure 4A:
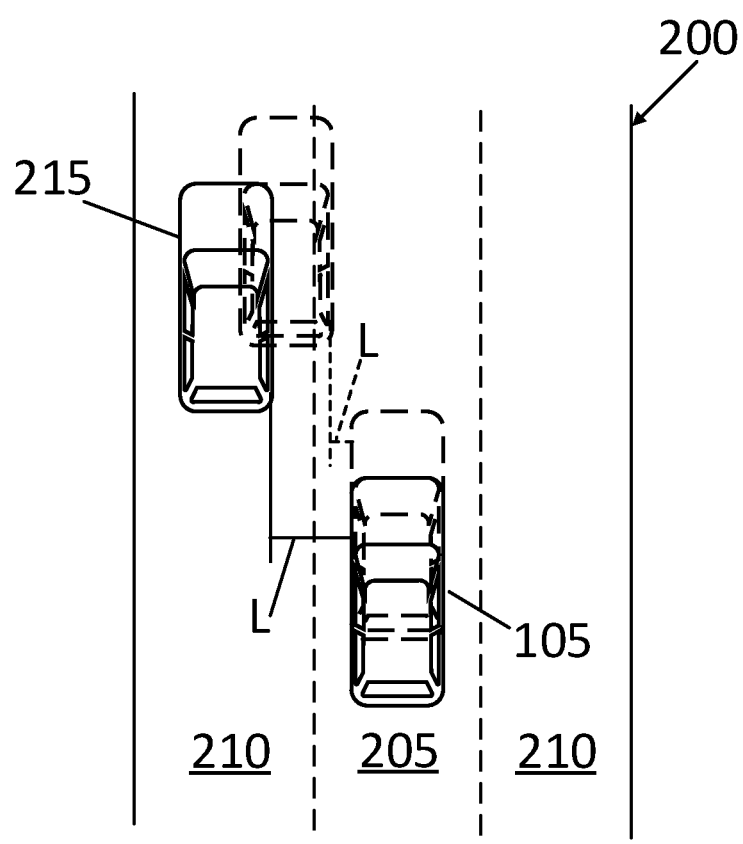
FIG. 4A is a diagram illustrating determining a change in a lateral distance between the host vehicle and the target vehicle.

The vehicle computer 110 can determine the lateral speed of the target vehicle 215 by determining a difference between a pair of lateral distances L between the target vehicle 215 and the host vehicle 105 over time, e.g., in substantially the same manner as discussed above regarding the longitudinal speed of the target vehicle 215. FIG. 4 shows one lateral distance L between the target vehicle 215 and the host vehicle 105 at one time in solid lines and another lateral distance L between the target vehicle 215 and the host vehicle 105 at another time in dashed lines.

Figure 4B:
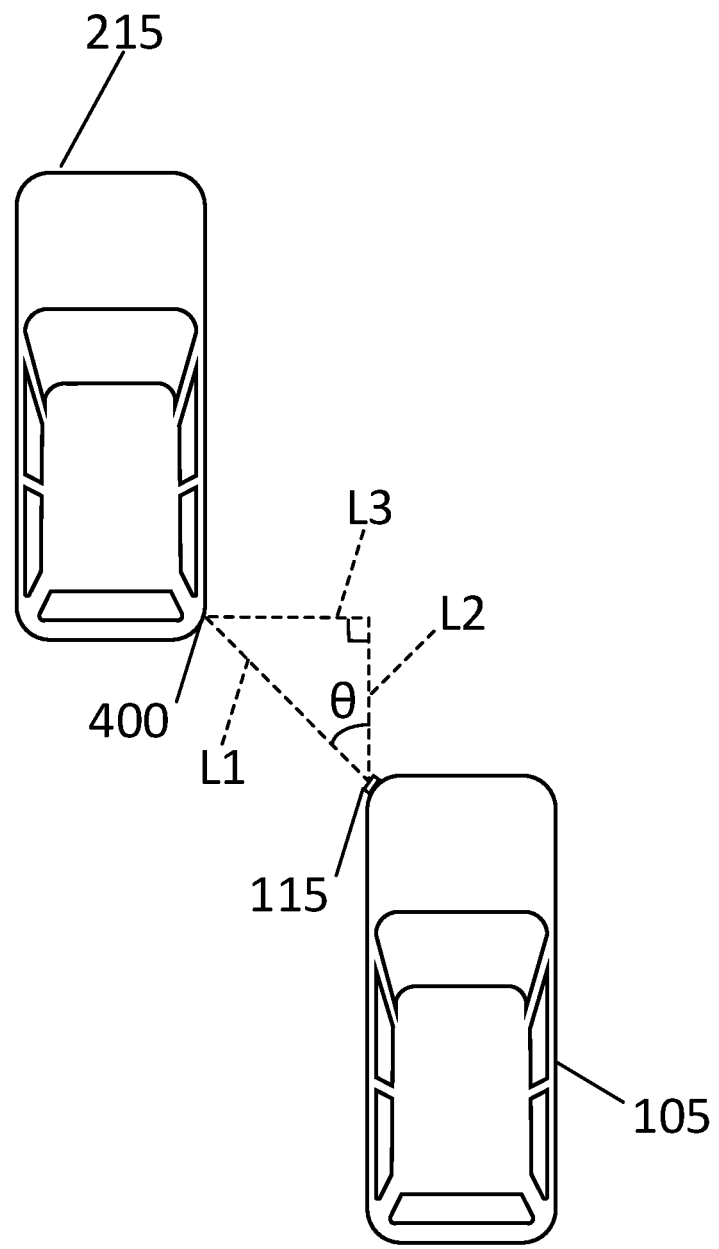
FIG. 4B is a diagram illustrating determining the lateral distance between the host vehicle and the target vehicle.
Figure 4C:
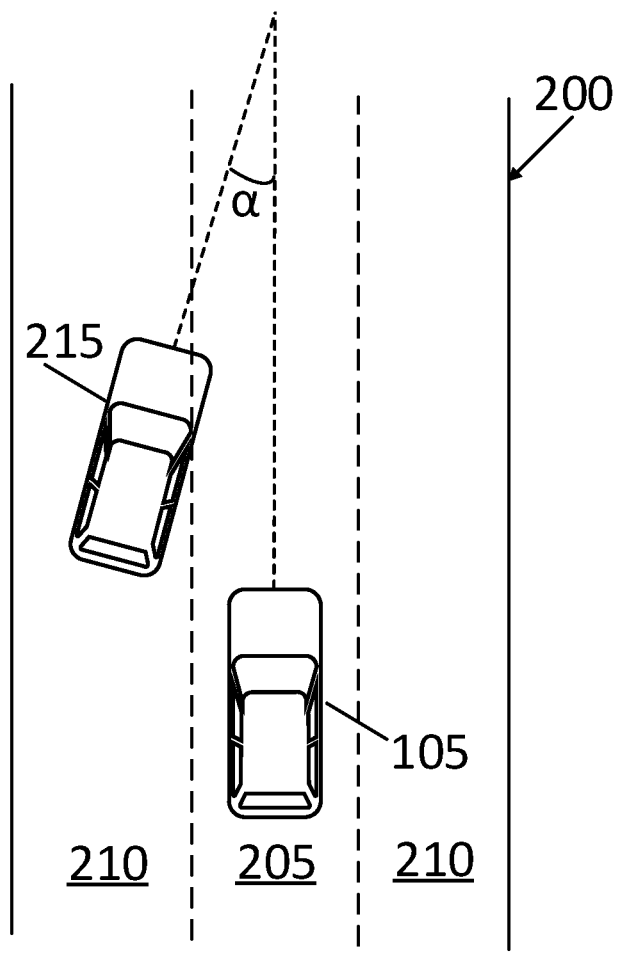
FIG. 4C is a diagram illustrating determining an angle of the target vehicle relative to the host vehicle.

To determine the lateral distance L between the host vehicle 105 and the target vehicle 215, the vehicle computer 110 can, for example, employ free space computation techniques to image data that identifies a range of pixel coordinates associated with the target vehicle 215 spaced laterally from the host vehicle 105 and free space (i.e., space in which no object is detected) between the host vehicle 105 and the target vehicle 215 (see FIG. 4B). By identifying a set of pixel coordinates in an image associated with the free space and the target vehicle 215 and determining a distance (in pixel coordinates) from an image sensor 115 lens, e.g., across the free space, to the identified target vehicle 215 pixel coordinates, the vehicle computer 110 can then determine a distance, e.g., across the free space, of the image sensor 115 lens from the target vehicle 215. That is, according to known techniques, the vehicle computer 110 can determine a distance from the lens to the identified coordinates (in pixel coordinates) and can further determine, from the image an angle θ between a line L1 from the sensor 115 lens to a point 400 on the identified target vehicle 215, and an axis extending from the lens parallel to the longitudinal axis of the host vehicle 105. Then, using trigonometric functions based on (i) the line L1 extending from the sensor 115 lens to the point 400 on the target vehicle 215, (ii) a line L2 extending from the sensor 115 lens along the axis, and (iii) a line L3 that intersects the point 400 on the target vehicle 215 and with which the line L2 extending along the axis forms a right angle, the vehicle computer 110 can determine a length of the line L3 drawn parallel to a host vehicle 105 lateral axis from (a) an axis extending from the sensor 115 lens parallel to a lateral axis of the host vehicle 105 to (b) the point 400 on the target vehicle 215. A lateral distance L may be determined from the length of the line L3 drawn parallel to a host vehicle 105 lateral axis.

As another example, the vehicle computer 110 can predict the trajectory T based on an angle α of the target vehicle 215 relative to the host vehicle 105. The vehicle computer 110 can determine the angle α of the target vehicle 215 based on image data including the target vehicle 215, e.g., according to image processing techniques. For example, the vehicle computer 110 can determine an angle α between a line extending along the longitudinal axis of the host vehicle 105 and a line extending along the longitudinal axis of the target vehicle 215 (see FIG. 4C). The vehicle computer 110 can then compare the angle α to a threshold angle. The threshold angle can be determined empirically, e.g., based on testing that allows for determining an angle of a target vehicle 215 relative to a host vehicle that indicates that the target vehicle 215 will pass through the host lane 205. The threshold angle may be stored, e.g., in a memory of the vehicle computer 110. If the angle α is less than or equal to the threshold angle, then the vehicle computer 110 determines that the trajectory T will remain in the host lane 205. If the angle α is greater than the threshold angle, then the vehicle computer 110 determines the trajectory T will pass through the host lane 205.

Additionally, or alternatively, upon detecting the target vehicle 215 entering the host lane 205, the vehicle computer 110 can identify the target vehicle 215 as a lead vehicle 220 based on a longitudinal speed of the target vehicle 215. The vehicle computer 110 can determine the longitudinal speed of the target vehicle 215, e.g., in substantially the same manner as discussed above regarding the longitudinal speed of the lead vehicle 220. The vehicle computer 110 can then compare the speed of the target vehicle 215 to the speed of the host vehicle 105. If the speed of the target vehicle 215 is less than the speed of the host vehicle 105, then the vehicle computer 110 can identify the target vehicle 215 as a lead vehicle 220. If the speed of the target vehicle 215 is greater than or equal to the speed of the host vehicle 105, then the vehicle computer 110 can determine that the target vehicle 215 is not a lead vehicle 220.

Additionally, or alternatively, upon detecting the target vehicle 215 entering the host lane 205, the vehicle computer 110 can identify the target vehicle 215 as a lead vehicle 220 based on a distance D between the target vehicle 215 and the host vehicle 105. The vehicle computer 110 can determine the distance D between the target vehicle 215 and the host vehicle 105, e.g., in substantially the same manner as discussed above regarding determining the distance D between the host vehicle 105 and the lead vehicle 220. The vehicle computer 110 can compare the distance D between the target vehicle 215 and the host vehicle 105 to the threshold distance. If the distance D is less than or equal to the threshold distance, then the vehicle computer 110 can identify the target vehicle 215 as a lead vehicle 220. As one example, when the vehicle computer 110 detected a presence of a lead vehicle 220, the vehicle computer 110 can identify the target vehicle 215 as a lead vehicle 220 based on detecting the target vehicle 215 entering the host lane 205 between the host vehicle 105 and the lead vehicle 220. If the distance D is greater than the threshold distance, then the vehicle computer 110 can determine that the target vehicle 215 is not a lead vehicle 220.

Additionally, or alternatively, the vehicle computer 110 can identify the target vehicle 215 as a lead vehicle 220 based on detecting the target vehicle 215 within the host lane 205 after expiration of a timer. A duration of the timer can be determined empirically, e.g., based on testing that allows for determining an amount of time required for a vehicle to pass through a lane (e.g., based on a speed of the vehicle). The duration of the timer can be stored, e.g., in a memory of the vehicle computer 110. The vehicle computer 110 can initiate the timer upon detecting the target vehicle 215 entering the host lane 205. If the vehicle computer 110 detects the target vehicle 215 within the host lane 205 (as discussed above) upon expiration of the timer, then the vehicle computer 110 can identify the target vehicle 215 as a lead vehicle 220. If the vehicle computer 110 detects that the target vehicle 215 is not in, i.e., has departed, the host lane 205 (as discussed above) prior to expiration of the timer, then the vehicle computer 110 can determine that the target vehicle 215 is not a lead vehicle 220.

Upon identifying the target vehicle 215 as a lead vehicle 220, the vehicle computer 110 can operate the host vehicle 105 based on the lead vehicle 220, 220. Specifically, the vehicle computer 110 can operate the host vehicle 105 to maintain at least the following distance between the host vehicle 105 and the lead vehicle 220, 220. That is, the vehicle computer 110 may adapt the longitudinal speed of the host vehicle 105 based on a longitudinal speed of the lead vehicle 220, 220.

To adjust the speed of the host vehicle 105, the vehicle computer 110 can, for example, access a look-up table, or the like, that associates various vehicle operations with various speeds of the lead vehicle 220, 220 relative to the host vehicle 105 and various distances D between the host vehicle 105 and the lead vehicle 220, 220. The vehicle computer 110 can determine a host vehicle 105 operation based on a stored operation that corresponds to a detected speed of the lead vehicle 220, 220 relative to the host vehicle 105 and a detected distance D between the lead vehicle 220, 220 and the host vehicle 105. The vehicle computer 110 can then operate the host vehicle 105 to satisfy, i.e., meet the criteria specified by the stored operation. For example, the host vehicle 105 can actuate one or more vehicle components 125 to perform the stored operation. An example look-up table is shown in Table 1 below:

TABLE 1

| Speed of Target Vehicle 215 Relative to Host Vehicle 105 | Distance D Between Host Vehicle 105 and Target Vehicle 215 | Vehicle Operation |
|---|---|---|
| +5 miles per hour (mph) | 5 meters | Release Throttle |
| 0 mph | 5 meters | Release Throttle and Pre-charge Brake |
| −5 mph | 5 meters | Apply brake to increase distance D to the following distance |

Upon determining that the target vehicle 215 is not a lead vehicle 220, the vehicle computer 110 can operate the host vehicle 105 based on the detected absence or presence of the lead vehicle 220, as discussed above. For example, the vehicle computer 110 may maintain operation of the host vehicle 105 while the target vehicle 215 passes through the host lane 205. Additionally, the vehicle computer 110 can actuate the HMI 118 to output a message indicating that the target vehicle 215 is passing through the host lane 205 and/or that the host vehicle 105 operation will not be adjusted based on the target vehicle 215.

Figure 5:
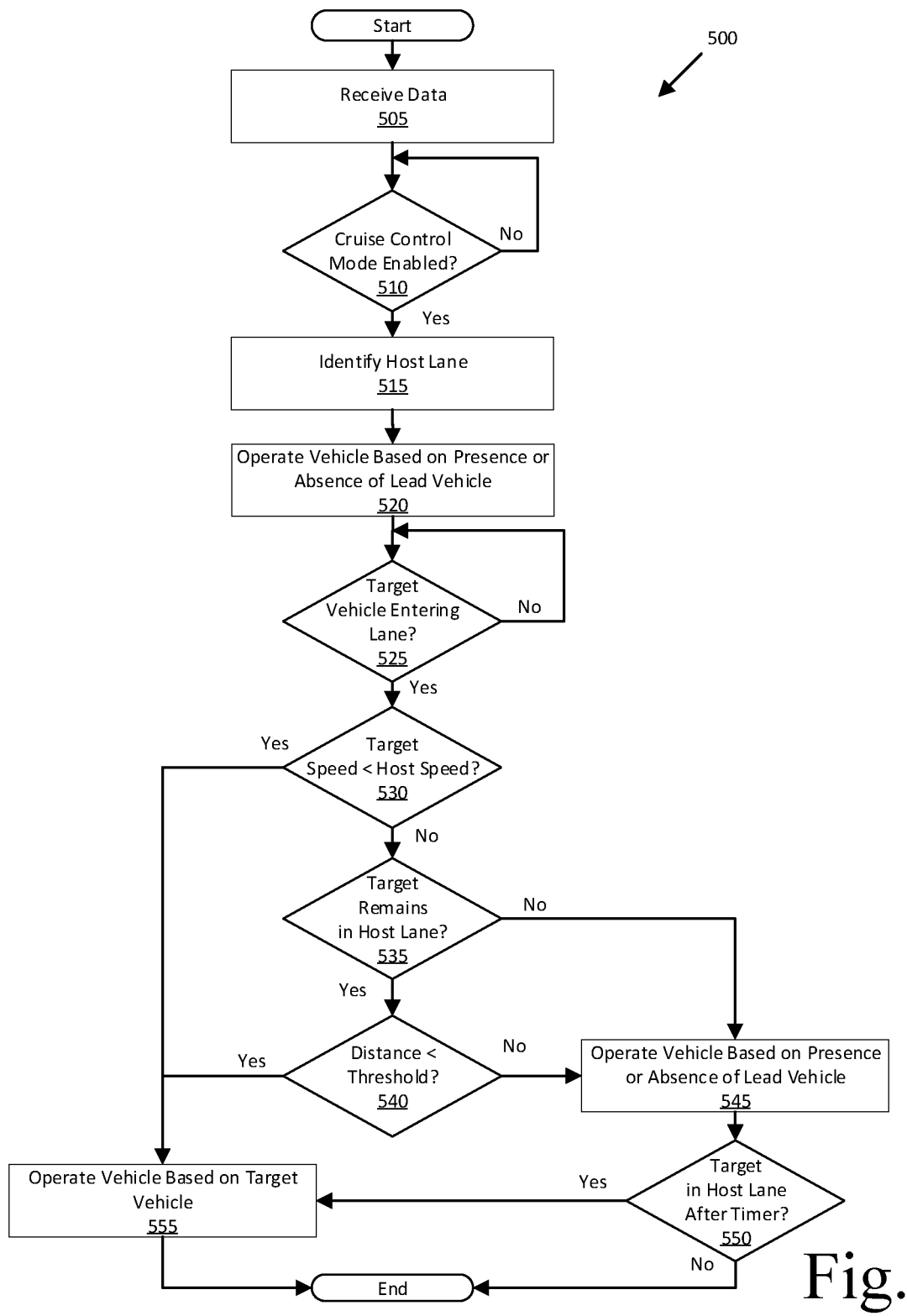
FIG. 5 is a flowchart of an example process for operating the host vehicle.

FIG. 5 is a diagram of an example process 500 for operating a host vehicle 105. The process 500 begins in a block 505. The process 500 can be carried out by a vehicle computer 110 included in the host vehicle 105 executing program instructions stored in a memory thereof.

In the block 505, the vehicle computer 110 receives data from one or more sensors 115, e.g., via a vehicle network, from a remote server computer 140, e.g., via a network 135, and/or from a computer in another vehicle, e.g., via V2V communications. For example, the vehicle computer 110 can receive location data, e.g., geo-coordinates, of the host vehicle 105, e.g., from a sensor 115, a navigation system, etc. Additionally, the vehicle computer 110 can receive image data, e.g., from one or more image sensors 115. The image data may include data about the environment around the host vehicle 105, e.g., lane markings on a road 200, other vehicles 215, 220 operating on the road 200, etc. The process 500 continues in a block 510.

In the block 510, the vehicle computer 110 determines whether to transition a cruise control mode to an enabled state. The vehicle computer 110 can transition the cruise control mode to the enabled state based on receiving a first user input selecting the cruise control mode, e.g., via an HMI 118, as discussed above. Upon transitioning the cruise control mode to the enabled state, the vehicle computer 110 can determine a pre-set speed, i.e., a maximum speed at which to operate the host vehicle 105 in the cruise control mode, based on receiving a second user input specifying the pre-set speed, as discussed above. If the vehicle computer 110 determines to transition the cruise control mode to the enabled state, then the process 500 continues in a block 415. Otherwise, the process 500 remains in the block 510.

In the block 515, the vehicle computer 110 identifies a host lane 205 and target lanes 210 on a road 200 based on sensor 115 data, as discussed above. The process 500 continues in a block 520.

In the block 520, the vehicle computer 110 operates the host vehicle 105 based on a presence or an absence of a lead vehicle 220, as discussed above. The vehicle computer 110 can determine a presence of an absence of a lead vehicle 220 based on sensor 115 data, as discussed above. The vehicle computer 110 adjusts the speed of the host vehicle 105 (e.g., based on a speed of the lead vehicle 220) to maintain at least a following distance between the host vehicle 105 and a lead vehicle 220, as discussed above. The process 500 continues in a block 525.

In the block 525, the vehicle computer 110 determines whether a target vehicle 215 is entering the host lane 205. The vehicle computer 110 can identify a target vehicle 215 based on sensor 115 data, as discussed above. The vehicle computer 110 can detect the target vehicle 215 entering the host lane 205 based on sensor 115 data, as discussed above. If the vehicle computer 110 detects a target vehicle 215 entering the host lane 205, then the process 500 continues in a block 430. Otherwise, the process 500 remains in the block 525.

In the block 530, the vehicle computer 110 determines whether the speed of the target vehicle 215 is less than the speed of the host vehicle 105. The vehicle computer 110 can determine the speeds of the target vehicle 215 and the host vehicle 105 based on sensor 115 data, as discussed above. The vehicle computer 110 can then compare the speed of the target vehicle 215 to the speed of the host vehicle 105. If the speed of the target vehicle 215 is less than the speed of the host vehicle 105, then the process 500 continues in a block 555. Otherwise, the process 500 continues in a block 535.

In the block 535, the vehicle computer 110 determines whether the target vehicle 215 will remain in the host lane 205 based on a predicted trajectory T of the target vehicle 215. The vehicle computer 110 can predict the trajectory T of the target vehicle 215 based on sensor 115 data, as discussed above. If the vehicle computer 110 determines that the target vehicle 215 will remain in the host lane 205, then the process 500 continues in a block 540. Otherwise, the process 500 continues in a block 545.

In the block 540, the vehicle computer 110 determines whether a distance D between the target vehicle 215 and the host vehicle 105 is less than a threshold distance. The vehicle computer 110 can determine the distance D between the target vehicle 215 and the host vehicle 105 based on sensor 115 data, as discussed above. The vehicle computer 110 can then compare the distance D between the target vehicle 215 and the host vehicle 105 to the threshold distance. If the distance D between the target vehicle 215 and the host vehicle 105 is less than the threshold distance, then the process 500 continues in a block 555. Otherwise, the process 500 continues in the block 545.

In the block 545, the vehicle computer 110 operates the host vehicle 105 based on a presence or an absence of a lead vehicle 220, as discussed above. The block 545 is substantially the same as the block 520 of process 500 and therefore will not be described further to avoid redundancy. The process 500 continues in a block 550.

In the block 550, the vehicle computer 110 determines whether the target vehicle 215 is in the host lane 205 after expiration of a timer. The vehicle computer 110 can initiate the timer upon detecting the target vehicle 215 entering the host lane 205. The vehicle computer 110 can detect a presence or absence of the target vehicle 215 in the host lane 205 based on sensor 115 data, as discussed above. If the vehicle computer 110 determines that the target vehicle 215 is in the host lane 205 after expiration of the timer, then the process 500 continues in the block 555. Otherwise, the process 500 ends.

In the block 555, the vehicle computer 110 operates the host vehicle 105 based on the target vehicle 215, as discussed above. The block 455 is substantially the same as the block 520 of process 500 and therefore will not be described further to avoid redundancy. The process 500 ends following the block 555.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
    while operating a host vehicle in a host lane, detect a target vehicle entering the host lane in front of the host vehicle from a first adjacent lane;
    predict a trajectory of the target vehicle based on sensor data;
    upon determining, based on the predicted trajectory, that the target vehicle will pass from the first adjacent lane through the host lane to a second adjacent lane, operate the host vehicle based on determining a presence or an absence of a lead vehicle; and
    upon determining that the target vehicle will remain in the host lane based on the predicted trajectory, operate the host vehicle with the target vehicle as the lead vehicle.

2. The system of claim 1, wherein the instructions further include instructions to operate the host vehicle based on a speed of the lead vehicle.

3. The system of claim 2, wherein the instructions further include instructions to update a speed of the host vehicle to maintain at least a following distance between the host vehicle and the lead vehicle.

4. The system of claim 1, wherein the instructions further include instructions to predict that the trajectory will extend through the lane based on detecting a lateral speed of the target vehicle that is greater than a threshold.

5. The system of claim 1, wherein the instructions further include instructions to predict that the trajectory will remain in the lane based on detecting a lateral speed of the target vehicle that is less than or equal to a threshold.

6. The system of claim 1, wherein the instructions further include instructions to predict that the trajectory will extend through the lane based on detecting an angle of the target vehicle relative to the lane being greater than a threshold.

7. The system of claim 1, wherein the instructions further include instructions to predict that the trajectory will remain in the lane based on detecting an angle of the target vehicle relative to the lane that is less than or equal to a threshold.

8. The system of claim 1, wherein the instructions further include instructions to identify the target vehicle as the lead vehicle additionally based on determining a speed of the target vehicle is less than a speed of the host vehicle.

9. The system of claim 1, wherein the instructions further include instructions to, upon detecting the target vehicle in the lane upon expiration of a timer, identify the target vehicle as the lead vehicle.

10. The system of claim 9, wherein the instructions further include instructions to initiate the timer upon detecting the target vehicle in the lane.

11. The system of claim 1, wherein the instructions further include instructions to, upon detecting the target vehicle departing the lane prior to expiration of a timer, operate the host vehicle based on the determined presence or absence of the lead vehicle.

12. The system of claim 11, wherein the instructions further include instructions to initiate the timer upon detecting the target vehicle in the lane.

13. The system of claim 1, wherein the instructions further include instructions to operate the target vehicle as the lead vehicle additionally based on a distance between the target vehicle and the host vehicle being less than a threshold distance.

14. The system of claim 1, wherein the instructions further include instructions to, upon determining the presence of the lead vehicle, operate the target vehicle as the lead vehicle additionally based on detecting the target vehicle entering the lane between the host vehicle and the lead vehicle.

15. The system of claim 1, wherein the instructions further include instructions to, upon detecting the target vehicle entering the lane, update a lateral position of the host vehicle within the lane.

16. A method, comprising:
    while operating a host vehicle in a host lane, detecting a target vehicle entering the host lane in front of the host vehicle from a first adjacent lane;
    predicting a trajectory of the target vehicle based on sensor data;
    upon determining, based on the predicted trajectory, that the target vehicle will pass from the first adjacent lane through the host lane to a second adjacent lane, operating the host vehicle based on determining a presence or an absence of a lead vehicle; and
    upon determining that the target vehicle will remain in the lane based on the predicted trajectory, operating the host vehicle with the target vehicle as the lead vehicle.

17. The method of claim 16, further comprising predicting that the trajectory will extend through the lane based on detecting a lateral speed of the target vehicle that is greater than a threshold.

18. The method of claim 16, further comprising predicting that the trajectory will remain in the lane based on detecting a lateral speed of the target vehicle that is less than or equal to a threshold.

19. The method of claim 16, further comprising predicting that the trajectory will extend through the lane based on detecting an angle of the target vehicle relative to the lane being greater than a threshold.

20. The method of claim 16, further comprising predicting that the trajectory will remain in the lane based on detecting an angle of the target vehicle relative to the lane that is less than or equal to a threshold.

* * * * *